(12) United States Patent
Baturin et al.

(10) Patent No.: US 11,005,949 B1
(45) Date of Patent: May 11, 2021

(54) SHARED HOSTING ENVIRONMENT MIGRATION WITH IP CHANGE AND DECREASED DOWNTIME

(71) Applicant: Plesk International GmbH, Schaffhausen (CH)

(72) Inventors: Alexey Baturin, Novosibirsk (RU); Sergey Lystsev, Novosibirsk (RU)

(73) Assignee: Plesk International GmbH, Schaffhausen (CH)

( * ) Notice: Subject to any disclaimer, the term of this patent is extended or adjusted under 35 U.S.C. 154(b) by 33 days.

(21) Appl. No.: 16/719,603

(22) Filed: Dec. 18, 2019

Related U.S. Application Data

(63) Continuation-in-part of application No. 15/361,141, filed on Nov. 25, 2016, now abandoned.

(51) Int. Cl.
*H04L 29/08* (2006.01)
*H04L 29/12* (2006.01)

(52) U.S. Cl.
CPC ........ *H04L 67/148* (2013.01); *H04L 61/1511* (2013.01)

(58) Field of Classification Search
CPC .......................... H04L 67/148; H04L 61/1511
See application file for complete search history.

(56) References Cited

U.S. PATENT DOCUMENTS

2009/0198817 A1* 8/2009 Sundaram ........... H04L 67/1095
709/227

OTHER PUBLICATIONS

Kirk McElhearn, "How to move your website to a new host," Apr. 8, 2015. (Year: 2015).*
Virendra Chandak, "Migrating servers using DNS TTL for minimum downtime." Dec. 17, 2011. (Year: 2011).*
Andy Forsberg, "How Name Servers & DNS records Work," Oct. 6, 2013. (Year: 2013).*
"Plesk server is running as primary DNS server," Jun. 15, 2015. (Year: 2015).*

* cited by examiner

*Primary Examiner* — Andrew C Georgandellis
(74) *Attorney, Agent, or Firm* — Bardmesser Law Group

(57) ABSTRACT

A method, system and computer product for a migration of a shared hosting environment with an IP change is provided. Migration is performed with the help of a special tool—the migrator. For each migrated domain on the source server, the TTL (time to live) values are decreased on the source DNS server. If possible, for a database server, a replication between the source and the target servers is set up for migrated databases. The migrator creates configuration of web sites and mail service on the target server and copies files and mail messages from the source to the target server; the migrator creates databases (if replication is not available) on the target server; and the migrator creates DNS zones with DNS records pointing to the target server. Once administrator checks that site works well on the target server, the migrator performs content sync and sets DNS zone on the source server as slave to DNS zone on the target server.

12 Claims, 11 Drawing Sheets

SHARED HOSTING ENVIRONMENT MIGRATION WITH IP CHANGE AND DECREASED DOWNTIME

BACKGROUND OF THE INVENTION

Field of the Invention

The invention relates to a shared hosting environment, and more particularly, to migration of shared hosting environment with IP change and minimum downtime.

Description of the Related Art

The industry trend of using shared hosting environments presents some challenges with regard to migration, which causes significant downtime. Shared hosting environment is typically represented by several domains (that can be owned by different people) with different services located on the same physical or virtual server. Typical services are: web, database, mail, domain name system (DNS), etc. There can be different reasons for migration of shared hosting environment to another server. For example, the reasons for migration can be outdated software on the source server, old hardware, maintenance of hardware, a need to move high-load sites to separate server, etc.

Migration of a shared hosting environment is a complex task, which inevitably causes downtime (unavailability of services during migration)—i.e., time when each service is not available to end-users or provides outdated data. It is desired to minimize the migration downtime. Conventionally, during migrating of a shared hosting environment, an IP switch is performed when the IP address is moved from the old server to the new server. However, if there are a lot of web sites and mailboxes operating on the same IP address on the source server (which is a common situation for shared hosting), it is necessary to move them all at once. In this case, the downtime is greater than the entire transfer time of all sites and mailboxes, which itself can be quite long. Also, the IP switch can be impossible due to network configuration (for example, IP routing when the source and the target servers are in different networks).

When the IP switch is not performed, and site/mail service is moved to another IP address, conventionally, the DNS records are updated to point to the target IP address after the migration. However, DNS propagation and cache update can take a long time, which results in a long downtime of shared hosting services. Additionally, the time of content migration (e.g., web files, mail messages, database tables, etc.) is added to a DNS switch downtime.

Accordingly, it is desired to have an efficient method for migration of shared hosting environment using IP change with a minimum downtime.

SUMMARY OF THE INVENTION

The invention relates to a shared hosting environment, and more particularly, to a migration of a shared hosting environment with an IP change and minimum downtime that substantially obviates one or more disadvantages of the related art.

In one aspect, a method, system and computer product for a migration of a shared hosting environment with an IP change is provided. Migration is performed with the help of a special tool—the migrator module. For each migrated domain on the source server, the TTL (time to live) values are decreased on the source DNS server. If possible, for a database server, a replication between the source and the target servers is set up for migrated databases. Migration of services is implemented as follows: the migrator module creates configuration of web sites and mail service on the target server; the migrator module copies files and mail messages from the source to the target server; the migrator module creates databases (if replication is not available) on the target server; and the migrator creates DNS zones with DNS records pointing to the target server.

Then, the end-user of a domain or the administrator confirms that site works well on the target server. Content synchronization is started, and the migrator synchronizes new files from the source to the target server. The migrator performs a DNS switch by setting a DNS zone on the source server as a slave to the DNS zone on the target server. After the DNS TTL time is elapsed, the content synchronization is started by the migrator and the database replication is disabled. Finally, the DNS is updated at registrar servers to point to the target server, and the TTL values are increased on the target server.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
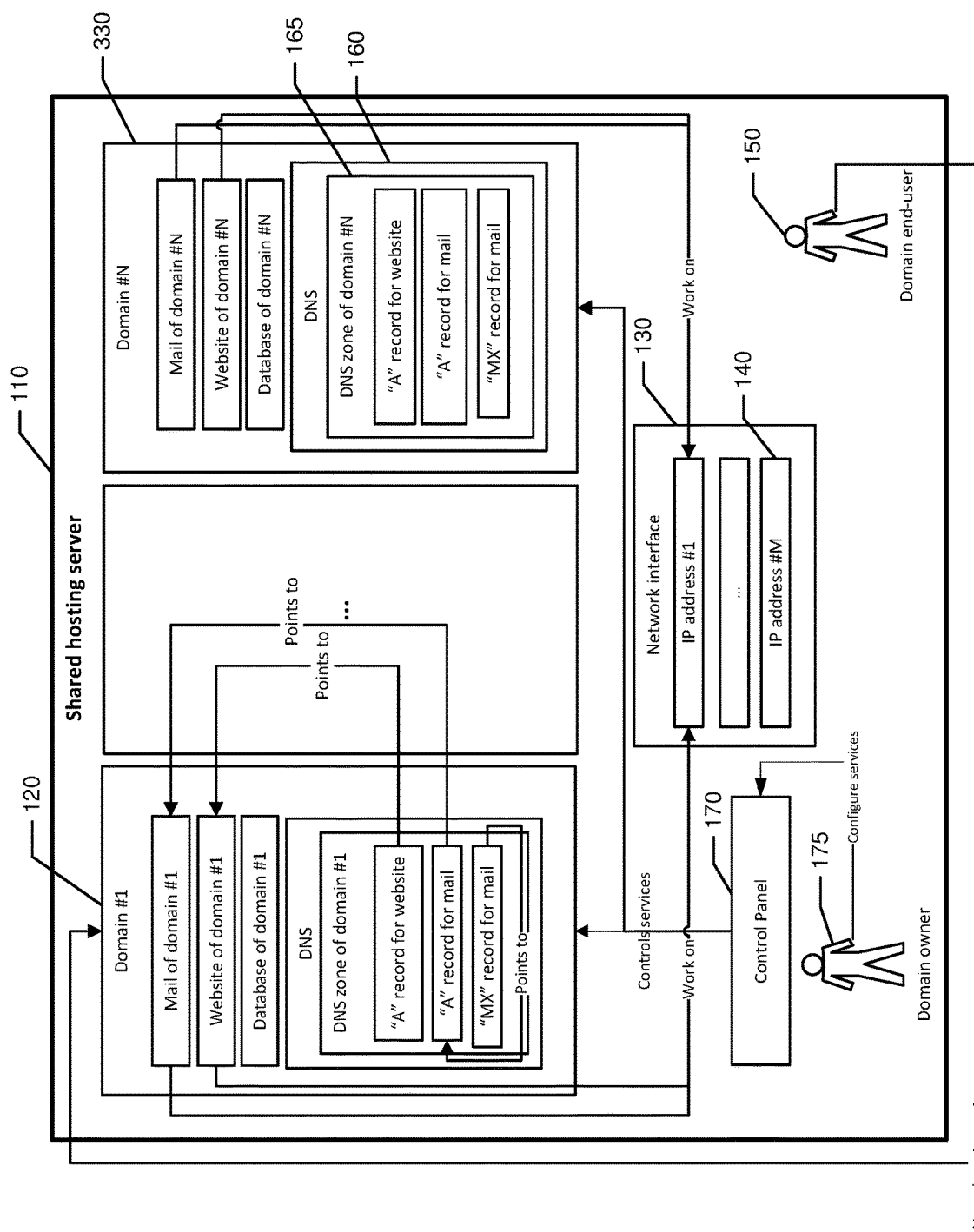
FIG. 1 illustrates a shared hosting environment used in the exemplary embodiment.

Reference will now be made in detail to the preferred embodiments of the present invention, examples of which are illustrated in the accompanying drawings.

The following definitions are used throughout the description.

Shared hosting server—a physical or virtual server where several domains are hosted at the same time. Hosting means providing some services specific for that domain—a web service, a mail service, a database and DNS, for example.

Source shared hosting server—a shared hosting server from which domains are to be migrated.

Target shared hosting server—a shared hosting server to which domains are to be migrated.

Migrator—an executable program module installed on the target server, which provides a user interface and controls a process (workflow) of migration. The migrator runs necessary software to transfer data, synchronize content, switch DNS, and other operations necessary for migration.

Administrator—a shared hosting server administrator, a person who is performing migration of one or several domains from a source shared hosting server to a target shared hosing server.

Domain owner—a person who owns a domain and manages services of the domain on a shared hosting server.

Domain end-user—a person who uses services of a domain: works with a web site on the domain, sends or receives mail to/from mailboxes of the domain.

Registrar—a company that manages domain name system at the top level. A domain must be created on DNS servers of registrar to be generally available.

DNS template—a template which helps the control panel to create DNS zone for a new domain. It consists of one or multiple template records. For example, a record may look like:

TYPE=A SRC=mail.<domain>DST=<ip.mail> and when the control panel instantiates the record for a new domain for "example.com", and mail is served on "192.168.1.1", a record becomes:

TYPE=A SRC=mail.example.com DST=192.168.1.1

Here "<domain>" and "<ip.mail>" are called variables, and "example.com" and "192.168.1.1" are called values. An example of DNS template management in control panel can be found at docs.plesk.com/en-US/onyx/administrator-guide/dns/dns-template.72226/

DNS template instantiation—a process when the DNS template is taken and concrete template variables (IP addresses of services and domain name) are replaced is called. As a result of DNS template instantiation, a DNS zone is created (consisting of DNS records) that could be served by DNS server. During DNS template instantiation, if a template contains a variable that resolves to multiple values (e.g., <ip.web> resolves to "192.168.1.1" and "192.168.1.2"), corresponding number of DNS records is created. If a variable does not resolve to any value (e.g., web service is absent), no DNS records are created by template record, which use that variable.

Accordingly, there is a source DNS template for the source control panel and a target DNS template for the target control panel.

Location—in the text below refers to either source or target.

According to an exemplary embodiment, migration is performed with the help of a special tool—the migrator. For each migrated domain on the source server, the TTL (time to live) values are decreased on the source DNS server. If possible, for a database server, a replication between the source and the target servers is set up for migrated databases. Migration of services is implemented as follows. The migrator creates configuration of the web sites and the mail service on the target server; the migrator copies files and mail messages from the source to the target server; the migrator creates databases (if replication is not available) on the target server; and the migrator creates DNS zones with DNS records pointing to the target server.

Then, the end-user of a domain or the administrator confirms that site works well on the target server. Content synchronization is started, and the migrator synchronizes new files from the source to the target server. The migrator performs a DNS switch by setting a DNS zone on the source server as slave to the DNS zone on the target server. After the DNS TTL time is elapsed, the content synchronization is started by the migrator and the database replication is disabled. Finally, the DNS is updated at the registrar servers to point to the target server, and the TTL values are increased on the target server.

A typical shared hosting environment is a server with several domains, where each of the domains has its own services: web, databases, mail and DNS. A web service with database represents a web site (i.e., a web application). A mail service is represented by mailboxes with mail messages. A DNS service is configured so end-users of the domain can perform the following operations:

get to the web site on the server when requesting domain name, by HTTP: DNS record of "A" type points to IP address of the web service on the server.

send mail messages to the server when sending messages to any mailbox on the domain: DNS record of "MX" type points to DNS record of "A" type, which points to IP address of the mail service on the server.

Note that it is a common situation when one IP address is used for multiple services of multiple domains. Two situations are possible for DNS configuration: when the DNS is served by an external DNS server, and when the DNS is served by a shared hosting server. In the first case, an administrator of the shared hosting server has no instant control over the DNS configuration and the DNS records. In such a case, to get IP address of web or mail services, the end user requests its own DNS server, which requests a chain of DNS servers, which ends with the external DNS server. The DNS server responds with the IP address. The external DNS server is usually served by a company called a registrar. To change the IP address to point to another server, it is required to ask the registrar to change the DNS zone, or change it with some tool on the registrar's side.

Such a request can take time, and different registrars have different tools. Different domains could be served by different registrars, so when migration of multiple domains is performed usually it is required to use different non-standard tools. Also, this can be done only by a domain owner, who is usually a different person than the server administrator. All these conditions make an automatic fast change of the IP address difficult, and in most cases impossible, during migration. In the second case, the administrator of the shared hosting server has instant control over the DNS configuration and the DNS records. Thus, he can change them on the server immediately, with no need to send a request to the registrar or to use other software.

There are two possible situations for downtime requirements depending on a website type. There are sites that are critical to an outdated data, and those that are not. Example of a site of the first type is an e-commerce site or a forum with many posters. In that case, a downtime is better because consistency is preferred over a data availability. Example of a site of the second type is a company or a personal blog or a homepage. In this case, data availability is usually preferred over a data consistency.

According to the exemplary embodiment, an overall migration goal is to minimize either downtime of each web site or the time when the end-users can get partly outdated data. For mail service, it is important not to lose any mail message and to keep mail service working during the entire migration cycle.

As discussed above, migration is performed by the server administrator with a special tool called a migrator. An algorithm for migration of a domain from one shared hosting server to another shared hosting server using the migrator tool is as follows. Note that some of the steps are optional depending on configuration. According to the exemplary embodiment, the key points of the algorithm are usage of DNS switch by setting source shared hosting server as a slave to the target shared hosting server, content synchronization and database replication.

Step 1: This step is necessary only if the DNS zone of the migrated domain is served by external DNS server. In this case, it is recommended to move the DNS zone of the domain to the source shared hosting server. It can be performed with no downtime, considering that the DNS zone is not changed during that step. That could be done in the following way. The DNS zone is copied from the external DNS server to the source shared hosting server. Then, the DNS records are switched at a registrar, and the process waits for the DNS propagation and cache updates. This step is performed typically manually, since different registrars often use different tools, although automation is possible in theory.

Step 2: Once DNS zone of the migrated domain is served by the source shared hosting server, administrator of the server starts migrator in the "prepare to migration" mode, which sets low DNS TTL values for the DNS zone. The migrator works as follows. First, it stores the old TTL values of the zone to a file or a database in order to restore them later. Then, it changes the TTL values of the zone on the source shared hosting server by using a control panel API or a direct modifications in configuration of the DNS server. Once this step is performed, the administrator should wait for the DNS cache updates before going further. The cache is updated in TTL time.

Step 3: The administrator of the server starts the migrator in the "initial migration" mode. The migrator copies configuration and data of all services of the migrated domain to the target shared hosting server. The DNS zone is copied to the target server, but changes are applied. In the simplest case all references to the source shared hosting server IP address are replaced with the target shared hosting server IP address. In more complex cases, when different services are located on different IP addresses, and/or mix of IPv4 and IPv6 is used, a more complex algorithm should be used, for example, the one described below in the "DNS records change algoritm" section. If database server configuration allows (depending on the database server type and the version on the source and the shared hosting servers), the migrator configures database replication for the databases of the domain between the source and the target shared hosting servers. Thus, after this step a full copy of the domain services exists on the target shared hosting server for some time. Before moving further, an administrator or a domain owner can verify that web site works well on the target shared hosting server.

Step 4: Once the data and the configuration is initially copied, the data and the configuration on the source server can change. So, to keep the copy up to date, the administrator of the server starts migration in the "sync data" mode. The migrator synchronizes files of the web service and mail messages using an available algorithm. For web files, a standard "rsync" utility can be used. For mail messages, on the Linux™ platform, the "rsync" utility can also be used. On the Windows™ platform and for cross-platform migrations, a utility described in "MAIL SERVER MIGRATION WITH MESSAGE SYNCRONIZATION," U.S. patent application Ser. No. 15/267,354, filed on 10 Sep. 2016, can be used. For databases, it is preferred to use replication, but when it is not available, full re-copy of databases can be used. According to the exemplary embodiment, the data can be synchronized several times to minimize synchronization time, which directly influences downtime or time when a web site provides outdated data. In case of a web site that is critical to outdated data, a web site is turned off before the final synchronization.

Step 5: The administrator of the server starts migrator in the "dns-switch" mode. The migrator configures the DNS server on the target so it works as a slave DNS server for the DNS zone of the domain, and the master server is the target DNS server. So, for any DNS request for the DNS zone of the domain, the source DNS server responses in the same way as the target DNS server. As the target DNS server responses with the DNS records that contain the target shared hosting server's IP address, the end-users of the services are finally working with the target shared hosting server, except for the DNS zone. The DNS switch is not instant, but is very fast, since the TTL is minimized at the first step. The DNS propagation and cache updates do not take more than double TTL times. The DNS reconfiguration can be performed in two ways. If a control panel (e.g., Plesk™) is installed on the source shared hosting server, the DNS zone can be switched in a slave mode with the help of the source panel API. Otherwise, the DNS zone can be switched directly in the DNS server configuration, which is usually Microsoft™ DNS or BIND.

Step 6: Once DNS propagation and cache update completes, the administrator of the server starts migrator in the "finalize mode." The migrator starts a final content synchronization (as in step 4). The migrator turns off the replication of the databases, if the replication is enabled. If the replication is not enabled, the databases on the target server are overwritten by the databases from the source server. The domain owner goes to the registrar and requests the DNS server changes. Once the DNS server is changed at registrar, and the end-users are redirected to the target shared hosting server, the domain is finally moved, and the administrator can remove or suspend the domain services on the source server.

When the exemplary method is not used, the downtime (or time when data is not up-to-date) is approximately equal to a sum of the data migration time, the DNS switch time and the DNS propagation time. The data migration time depends on the data volume. It consists of mail migration time, web files migration time and database migration time. The DNS switch time depends on how fast the DNS zone can be updated at the registrar. The DNS propagation time depends on the initial TTL value, which is usually is greater than an hour.

When the exemplary method is used, the downtime (or time when data is not up-to-date) approximately equals to a sum of the data sync time, the DNS switch time and the DNS propagation time. The content synchronization time for mail messages and web files depends on a volume of changed data since the initial migration, which is usually small. So, the content synchronization time is much shorter than the content migration time. For databases, if replication is used, practically no content synchronization is required. If replication is not used, the database synchronization time equals to the database migration time, so there is no advantage. The DNS switch time is close to zero and depends on the method used to perform it (i.e., a direct DNS server configuration or a control panel API). The DNS propagation depends on a changed TTL value, which is minimized at the initial step. A typical value for the minimized TTL is around one minute, which is much less than the typical TTL. Based on the above discussion, the downtime when the proposed method is used is, advantageously, much shorter than the conventional downtime.

DNS Records Change Algorithm

When source services of domain are served on the single IP address on the source server and another single IP address on the target server, the DNS zone after migration is modified to make it pointing to the target server: for each DNS record of the zone the source IP address is changed to the target IP address. However if different services (e.g., mail, web, database) are served on a different IP addresses (e.g., mail on 192.168.1.1, web and database on 192.168.1.2), IP address change becomes tricky because it is difficult to identify which service each DNS record corresponds to, and which IP addresses should be used during replacements. Additional difficulties can be: absence of the service on the source/target server (e.g., when mail is not migrated and left on the source server, while web and database are migrated), multiple IP address types and type changes (e.g., IPv4 and IPv6 on the source server, and IPv4 only on the target server).

Below is an algorithm that helps to resolve the described problem. The following terms are used:

The algorithm is as follows:
1. Instantiate source DNS template using IP addresses of source services and put them to DNS records collection called SOURCE-DEFAULT.
2. For each DNS record in the SOURCE-DNS-ZONE collection created out of the source DNS zone, remove all records which are present at SOURCE-DEFAULT collection. Call the resulting collection as SOURCE-CUSTOM.
3. For each DNS record in SOURCE-CUSTOM collection:
   a. If the record has source IP address of a mail service and looks like mail record (e.g., A/AAAA record which has corresponding MX records at SOURCE-CUSTOM collection), change IP addresses of the source mail service to the target mail service.
   b. If the record looks like database record (e.g., A/AAAA record starts with "db.", "mysql.", "mssql.", and IP is among of source database service IPs), change IP addresses of the source database service to the target database service.
   c. Look through all TXT/SRV record. For known types (e.g., SPF records) change IP addresses to corresponding records of the target server.
   d. (the algorithm can be extended with other heuristic conditions which detect the service the record corresponds to)
   e. If the record is not matched by previous items, and contains IP address which we can't match to a service, and the IP address is among source IP adresses (e.g., IP address corresponds both to mail and web service, and we don't know which service exactly corresponds to—mail or web), then change the IP address to IP address of the target web service.
4. Instantiate the target DNS template using IP addresses of target services and put them to DNS records collection called TARGET-DEFAULT.
5. Join SOURCE-CUSTOM collection with TARGET-DEFAULT collection into RESULT-DUP collection.
6. Remove all duplicate DNS records (DNS records which have the same SRC, DST, . . . ) from RESULT-DUP collection and put them into RESULT collection.

Both source and target domains could have services served on:
one IPv4 address
one IPv6 address
both IPv4 address and IPv6 address
a service can be absent on a location IP address change algorithm which considers IPv4/IPv6 and service absence for A/AAAA record is as follows:
1. Create empty IP-CHANGE-RESULT collection.
2. For source A or AAAA record, if IPv4 exists for corresponding service, create A record with source IPv4/IPv6 replaced with target IPv4 IP-CHANGE-RESULT collection.
3. For source A or AAAA record, if IPv6 exists for corresponding service, create AAAA record with source IPv4/IPv6 replaced with target IPv6 and add to IP-CHANGE-RESULT collection.
4. Return the IP-CHANGE-RESULT collection.

Similarly, the algorithm works for the case of multiple IPv4/IPv6 addresses—instead of a single DNS record, multiple records are created. Also the algorithm could be extended to TXT/SRV records.

Another algorithm extension is to detect DNS records which were removed after the template instantiation on the source server. For each record at SOURCE-DEFAULT collection do not create a corresponding record(s) at TARGET-DEFAULT collection if the record from SOURCE-DEFAULT collection does not exist on the source DNS zone.

As a result, the algorithm:
1. Covers migration of multiple shared hosting services at once (e.g., mail+web).
2. Covers different IP addresses for different services on the source and on the target panel. Note: different IP addresses can mean that the services are located on different servers, so the algorithm covers migration from source multi-server environment to target multi-server environment.
3. Same IP address for different services on the source and on the target server.
4. Any combination of (1) and (2).
5. Absence of the service on the source or the target panel.
6. IPv4 and IPv6 combinations and situation when same service is served by multiple IP addresses of same/different type.
7. Custom records are migrated as is, making external services (e.g., YANDEX Mail for domain) to work after migration.

The only pre-requirement for an algorithm is explicit (when a user is able to view and manage it from the control panel) or implicit (when a user is not able to view or manage it, but each new DNS zone is created with the help of rules which could be expressed by DNS template) presence of DNS template both on the source and the target control panels.

Detecting Moment to Start Content Synchronization

Figure 10:
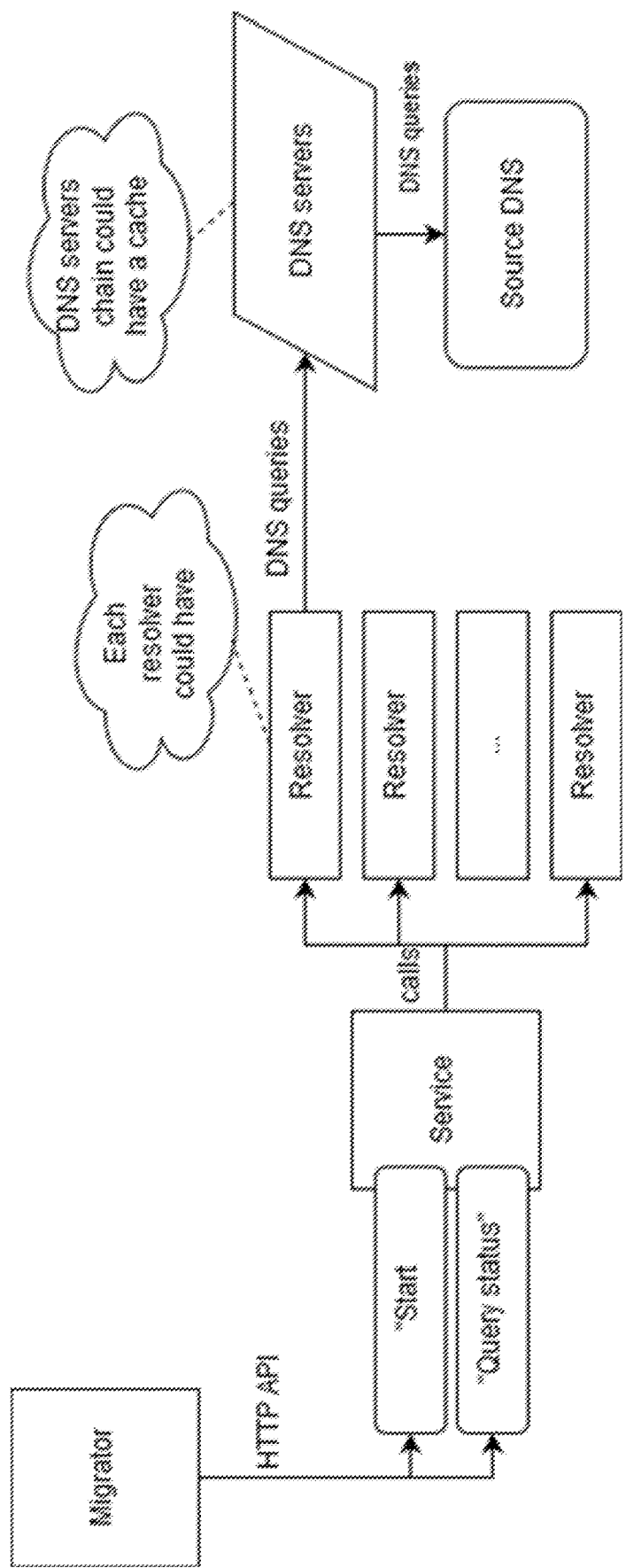
FIG. 10 shows the structure of a service that detects a moment to start content synchronization.

On a real environment, it can be difficult to predict actual time the administrator (the migrator) should wait after a DNS switch is initiated, before the actual DNS switch happens. This happens because there are different DNS resolver (client) implementations, which could have their own caching features which influence on real DNS switch time, and there are different DNS servers chain the DNS request could come through. Moreover, sometimes DNS resolvers and DNS servers do not follow RFC and ignore actual TTL values of the DNS zone. To solve the issue and find the most accurate moment when migration should be proceeded, a special DNS switch monitoring service can be used, see FIG. 10.

The service accepts two kinds of API (e.g., REST API) requests:
1. "Start monitoring", which accepts domain name and creates new monitoring session and responds with session ID.
2. "Query status", which accepts session ID and returns whether DNS switch actually happened.

Internally it consists of an API server, and multiple DNS resolvers (e.g., the first-server with MICROSOFT WINDOWS and nslookup utility connected to some provider's DNS, the second—server with UBUNTU connected to GOOGLE DNS). When the API server gets "Start monitoring" request, it queries all DNS resolvers to get IP address the domain resolves to, and saves the IP address to a persistent storage along with session ID. When the API server gets "Query status" request, it queries all DNS resolvers again to get IP address the domain resolves to. Then the service compares the IP address with already saved value: if all DNS resolvers returned the new IP address, then the service responds with "true" value, otherwise it responds with "false" value.

The migrator uses the service in the following way:
1. Before running the Step 5 for a domain, the migrator sends "Start monitoring" request to the service specifying the domain name.
2. Then, Step 5 is executed.
3. After that, the migrator polls the service periodically (e.g., once a minute) with "Query status" request.
   If the service responds with "false", polling is continued.
   If the service responds with "true", the migrator proceeds to Step 6

Traffic Proxying

As noted above, when migrating a dynamic website (e.g., blog, forum, e-commerce application), a user has to select between 2 options during migration: downtime or out-of-date data. In some circumstances, that could be completely avoided by using method described below.

Before starting the actual data transfer, the migrator installs a special proxy application to the source server which listens to HTTP/HTTPS port and proxies all HTTP/HTTPS queries to the original web server, reconfigured to listen on another ports. Once the initial files and database data transfer has happened for a particular domain, the migrator sends a special query to the proxy application. The query contains two parameters: name of the migrated domain and the target IP address. The proxy starts acting in the following way: each HTTP/HTTPS query received by the proxy which is related to the migrated domain is sent by the proxy both to the source web server (on the source IP address) and to the target web server (on the target IP address). The response from the source web server is received by the proxy application and sent to the HTTP client. The response from the target web server is received by the proxy application, and never sent to the HTTP client. Thus, both applications on the source and on the target servers receive the same HTTP requests. Let's define applications state as file system state and database state, where file system state is the whole file structure (files, directories, contents, file attributes) and database state is the whole database structure and data (tables, rows with their contents). In the simplest situation, if the same HTTP requests change applications' state equally both on the source and the target server by application's design, we keep the filesystem and database states synchronized before real DNS switch. That makes Step #4 unnecessary for web files and database, and decreases downtime.

The proxy method could be improved: the migrator installs the same proxy application to the target server which acts in the same way: each HTTP/HTTPS request is sent both to source and target web server, the response for the HTTP client is taken from any of the responses, the other one is ignored. That will keep both application states up to date, and in that situation DNS switch time is not included into downtime.

The proxy method described above works only in special conditions and has limitations:
   The migrator should be able to install additional software on the source and on the target server, and the migrator should be aware of a way to re-configure the source and the target web servers to listen on another port.
   Application should be written in a way, so when you have application's state S1, and HTTP request R, the request always leads to the same state S2, regardless of the environment.
   Even considering previous condition, the order of incoming HTTP requests may be different for the source and the target server, and some of the HTTP requests may be processed in parallel way. To avoid that, an additional synchronization of the proxy applications is required, and parallel request processing should be disabled. That could significantly decrease performance of the application for the migration time.
   The method is sensitive to network failures, e.g., if connection from the proxy on the source server to the web server on the target server fails, or times out, only the source server gets correct application state.
   It supports only simple request-response HTTP/HTTPS, no Websocket or HTTP/2.0 is supported.

Figure 11:
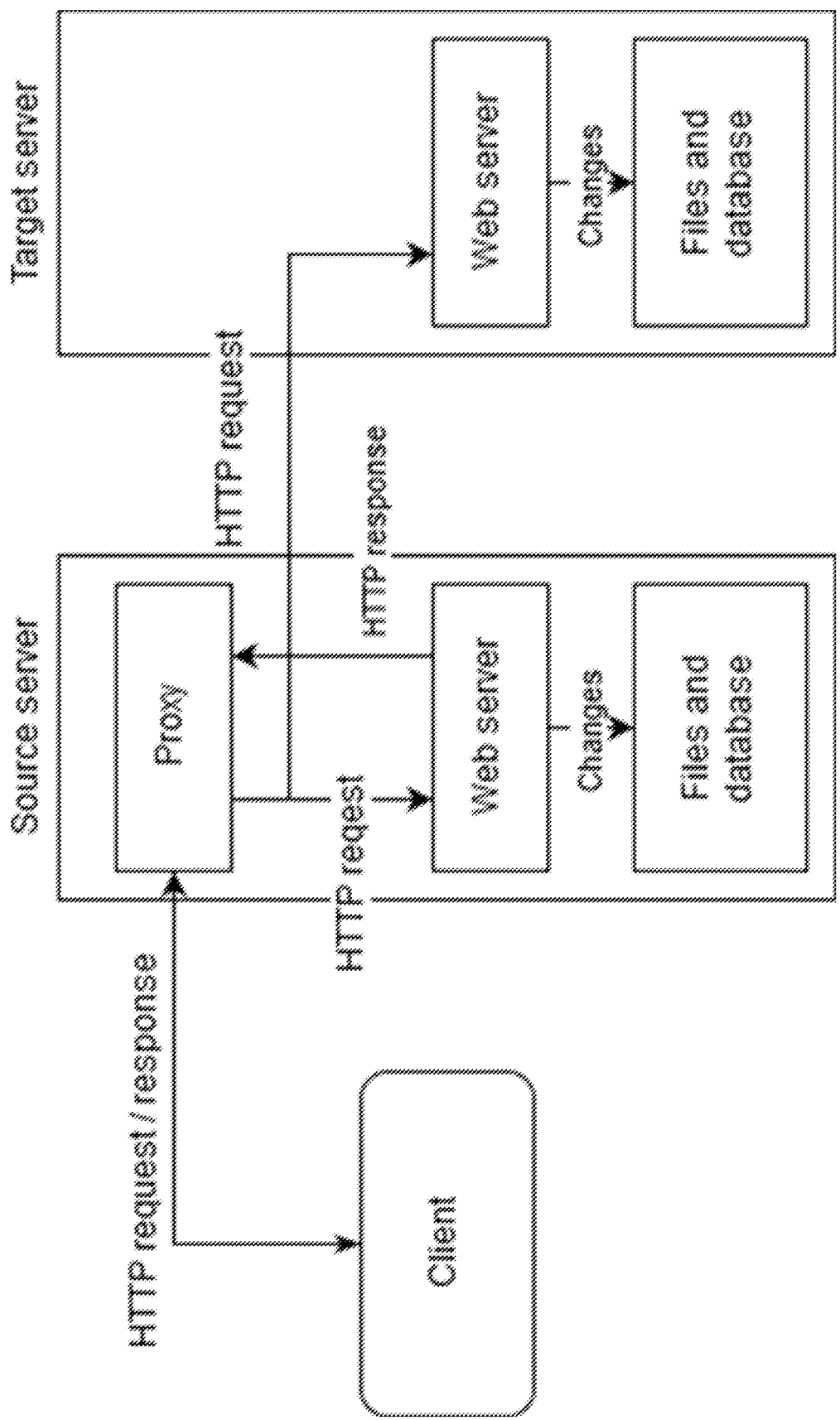
FIG. 11 shows how a special proxy interacts with HTTP client and web servers involved in the migration.

Comparing to simple request proxy which simply redirects all HTTP/HTTPS requests to the target server once the data is transferred, the method described above, and illustrated in FIG. 11 allows to rollback to the source website without any consequences until someone confirms that the site works well.

FIG. 1 illustrates a shared hosting environment used in the exemplary embodiment. A shared hosting server 110 serves multiple domains 120. Each domain consists of several services: mail, website, database and DNS. A web application, which uses some databases from database service, resides on the website service. The server has a network interface (TCP/IP) 130 where several IP addresses 140 are configured. Each service (mail, website, database and DNS) works on a public IP address. An end user 150 of the domain services is a person who uses the services by that public IP address. A key point of the shared hosting environment 110 is that many services on many domains share the same public IP address. To know the IP address of a service, the end user 150 of the domain services 120 uses a DNS system. In typical configuration, the DNS system uses the domain's DNS service 160 running on the shared hosting server 110. The domain's DNS service is presented by the DNS zone 165 with several DNS records. For a website, there is a record of "A" type, which points to the IP address of the website service. For mail service, there are records of "MX" and "A" types, where the "MX" record points to the record of the "A" type, and the record of the "A" type points to the IP address of mail service. Additionally, the shared hosting server 110 can be controlled by a control panel (e.g., Plesk™ or cPanel™) 170, which helps each domain owner 175 to configure the services. The control panel 170 can provide an API interface to configure the services, including the DNS service 160.

Figure 2:
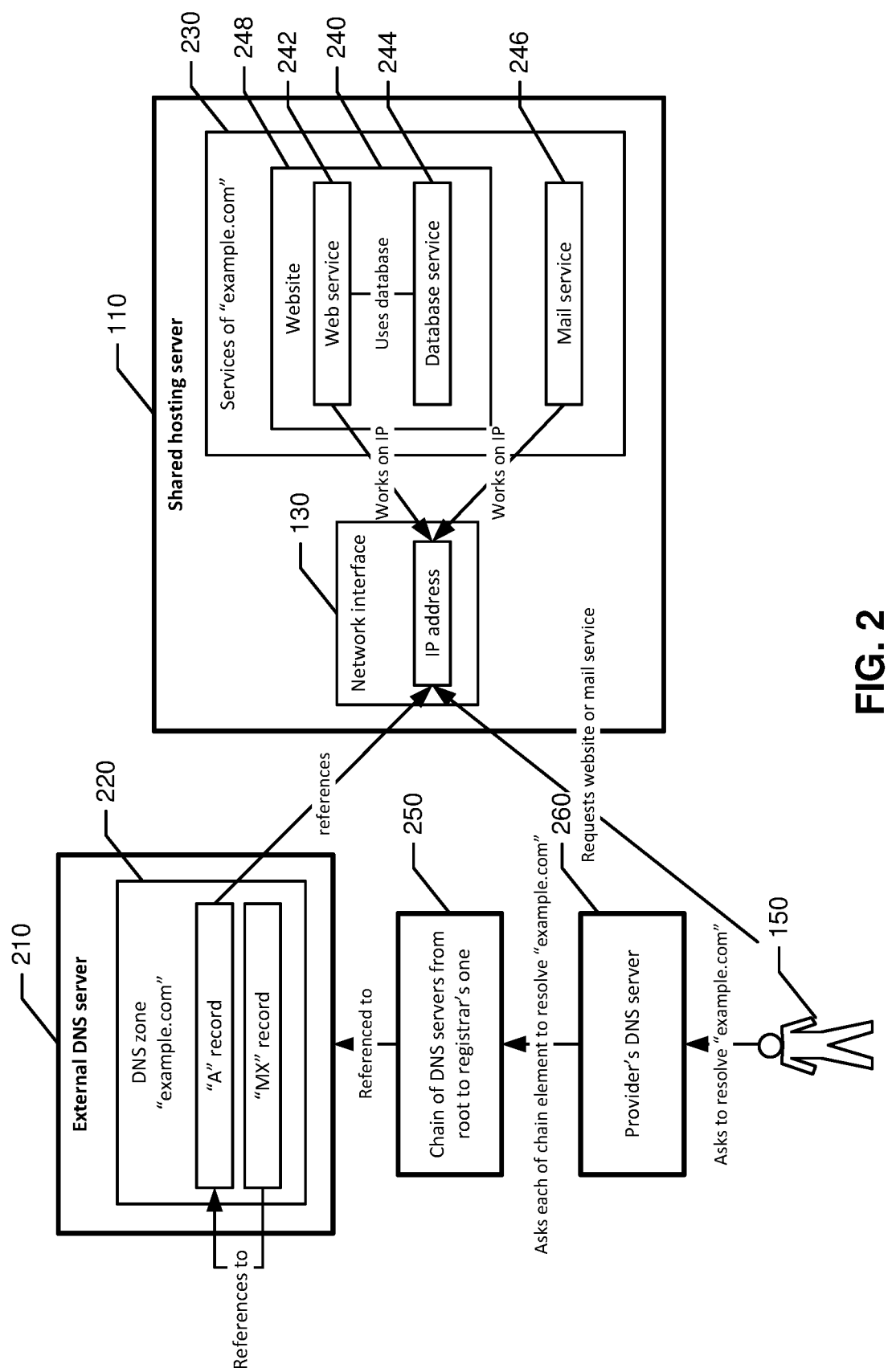
FIG. 2 illustrates an initial DNS configuration when a service is controlled by an external DNS server, in accordance with the exemplary embodiment.

FIG. 2 illustrates an initial DNS configuration when a service is controlled by an external DNS server, in accordance with the exemplary embodiment. Note that the DNS service is controlled by the external DNS server 210—not by the shared hosting server. There is a shared hosting server 110 with a domain "example.com" and several domain services (web, database and mail) 230. The web service 242 of the domain uses a database service 244, and both of them together form the website 248. The shared hosting server has a network interface (TCP/IP) 130 with an IP address. The web service 242 and the mail services 246 work on the IP address. First, a domain user 150 requests a provider's DNS record to resolve the domain name. The provider's DNS server 260 asks a chain of the DNS servers 250 responsible for different levels of the domain name.

Each server in the chain responses with the next element in the chain. Finally, the last element of the chain responses with an external DNS server 210, which serves the DNS zone 220 of the domain "example.com." The DNS zone 220 is presented by several records of different types, namely— "MX" and "A." The "MX" record refers to the "A" record. Each "A" record refers to the IP address of some service of the domain. So, for example, the end-user 150 of the domain services gets the IP address of web service 242 with the help of the chain of the DNS servers 250, which ends with the external DNS server 210.

Figure 3:
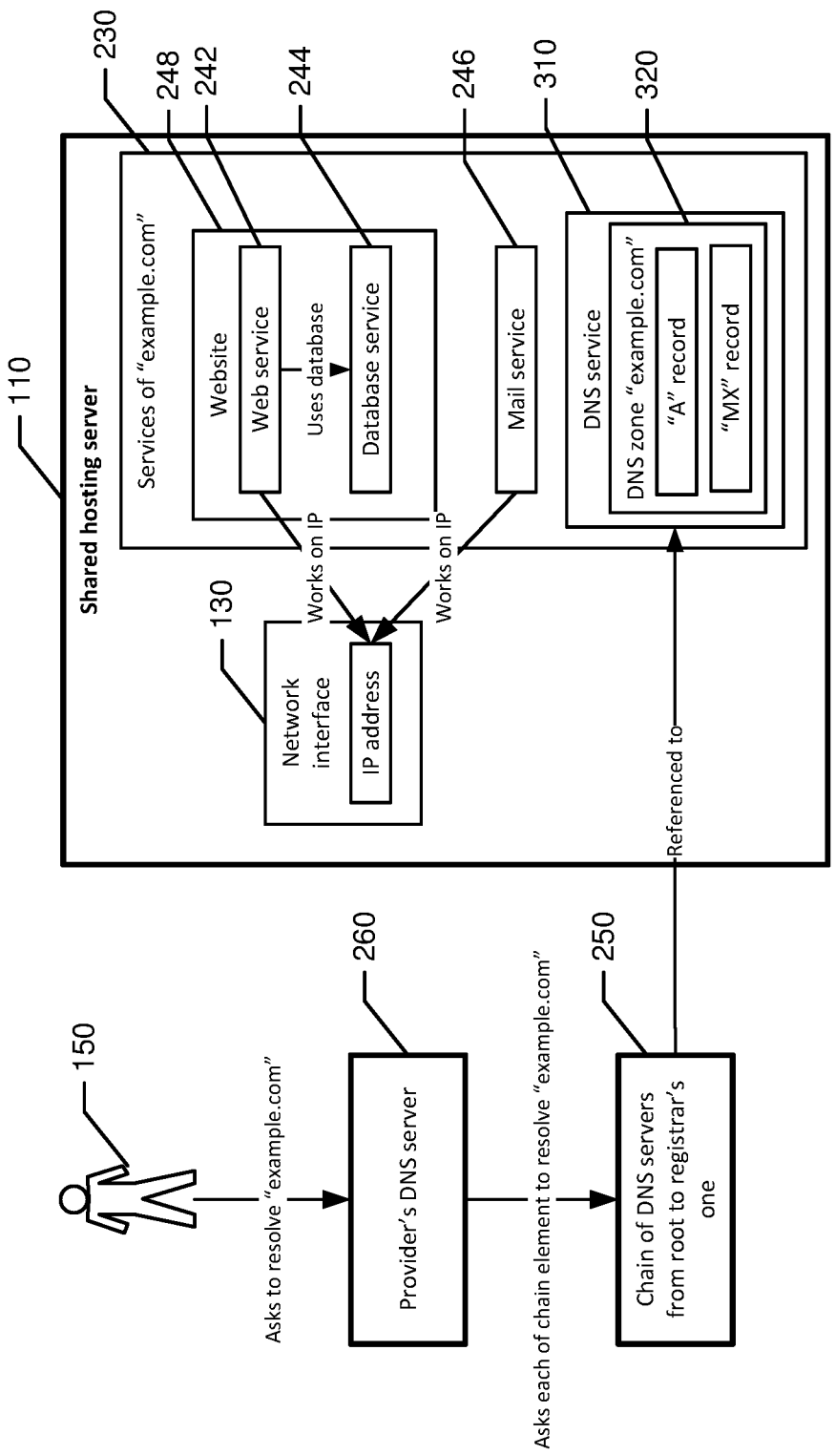
FIG. 3 illustrates an initial DNS configuration when a service is controlled by a shared hosting server, in accordance with the exemplary embodiment.

FIG. 3 illustrates an initial DNS configuration when a service is controlled by a shared hosting server, in accordance with the exemplary embodiment. There is a shared hosting server 110 with a domain "example.com," several domain services (web, database and mail) 230. The web service 242 of the domain uses the database service 244, and both of them together form the website 248. The shared hosting server 110 has a network interface (TCP/IP) 130 with an IP address. The web service 242 and the mail service 246 work on the IP address. Additionally to the web, mail and database services, there is a DNS service 220 running on the shared hosting server 110. The DNS service 310 serves the DNS zone 320 of the domain "example.com," which is represented by the records of different types ("A" and "MX"). The records point to the IP address of the domain services. First, the domain user 150 requests the provider's DNS record to resolve the domain name.

The provider's DNS server 260 asks a chain of the DNS servers 250 responsible for different levels of the domain name. Each server in the chain responses with the next element in the chain. Finally, the last element of the chain responses with the shared hosting server 110, which serves the DNS zone 320 of the domain "example.com." So, for example, the end-user 150 of the domain services gets the IP address of the web service 242 with the help of the chain of the DNS servers 250, which ends with the shared hosting DNS server.

Figure 4:
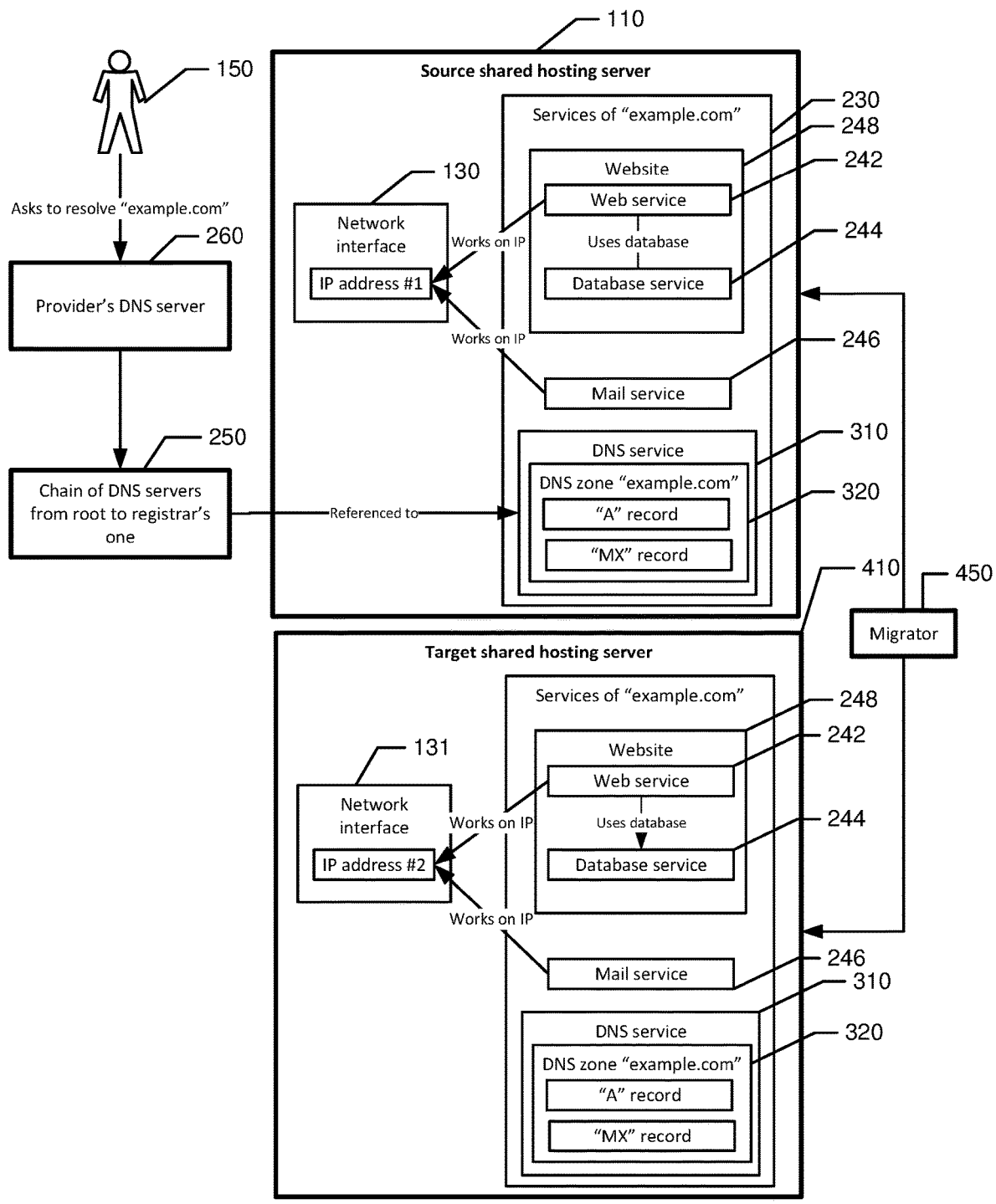
FIG. 4 illustrates an initial migration step when a DNS service is controlled by a shared hosting server, in accordance with the exemplary embodiment.

FIG. 4 illustrates an initial migration step when a DNS service is controlled by a shared hosting server, in accordance with the exemplary embodiment. There are two servers: the source shared hosting server 110 and the target shared hosting server 410. There are web, database, mail (242, 244, 246) residing on the source shared hosting server 110. The source shared hosting server 110 has a network interface (TCP/IP) 130 with an IP address. The services of the domain work on the IP address. Additionally, there is a DNS service 310 running on the source shared hosting server 110. It serves the DNS zone 320 of the domain "example.com," which is presented by records of different types ("A" and "MX"). The records point to the IP address of the domain services on the source shared hosting server 110.

After the initial migration, all the services of the domain (i.e., web, database, mail and DNS service) are cloned by the migrator 450 to the target shared hosting server 410. When the end user of the services tries to resolve the domain name to the IP address, it uses provider's DNS server 260, which (with the help of DNS servers chain 250) finally points to the source shared hosting server 110. The DNS service 310 on the source shared hosting server 110 points to the source shared hosting server 110. Thus, the end user gets to the source shared hosting server.

Figure 5:
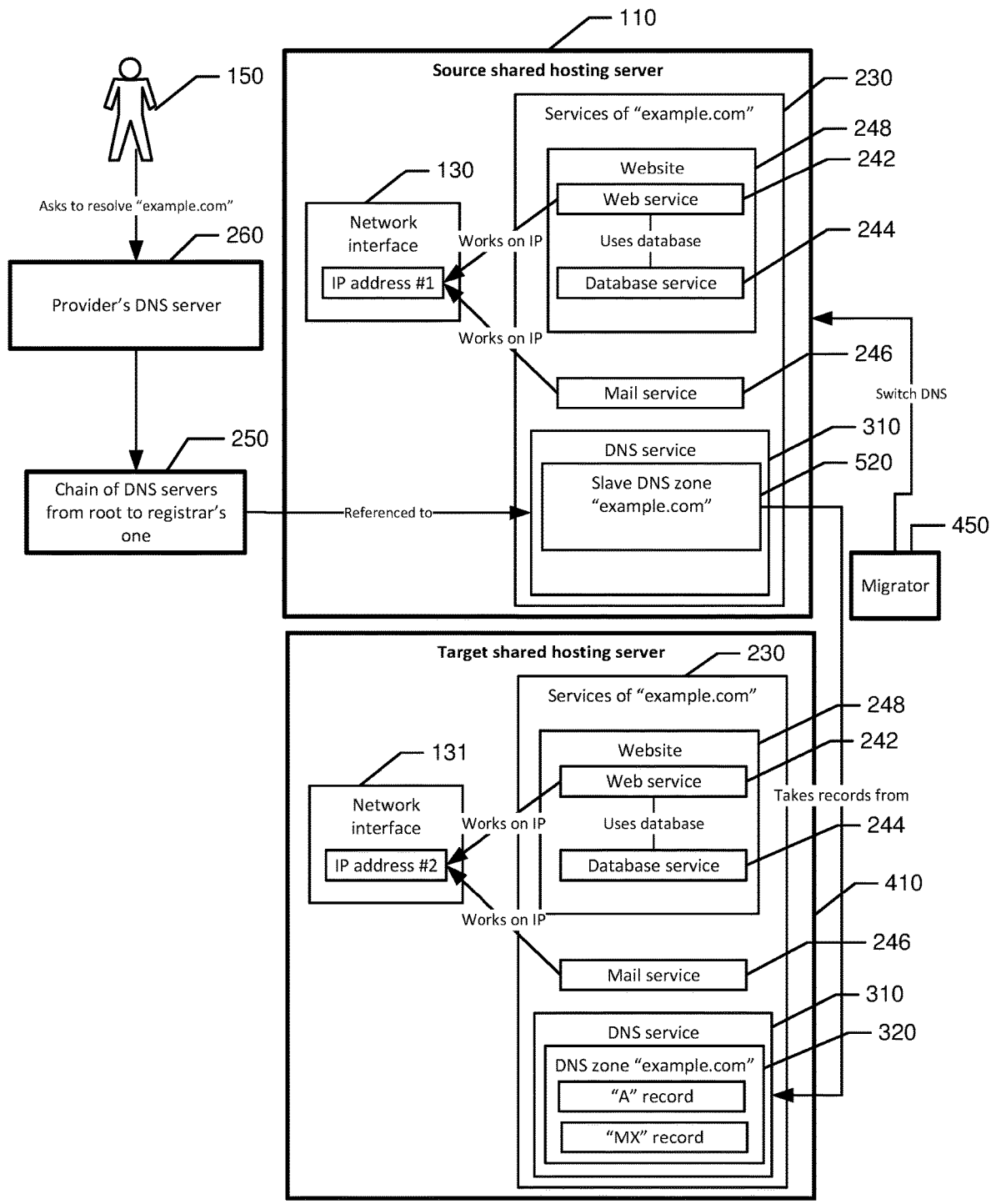
FIG. 5 illustrates a switch step when a DNS service is controlled by a shared hosting server, in accordance with the exemplary embodiment.

FIG. 5 illustrates a switch step when a DNS service is controlled by a shared hosting server, in accordance with the exemplary embodiment. FIG. 5 shows the final migration step when the DNS service 310 of the migrated domain is controlled by the shared hosting server 110. There are two servers: the source shared hosting server 110 and the target shared hosting server 410. There are web, database, mail (242, 244, 246) and DNS service 310 residing on the source shared hosting server 110. The source shared hosting server 110 has a network interface (TCP/IP) 130 with an IP address. The services of the domain work on the IP address. There are clones of web, database, mail and DNS services from the source shared hosting server 110 residing on the target shared hosting server 410.

The target shared hosting server has a network interface (TCP/IP) 131 with the IP address. The services of the domain on the target shared hosting server work on the IP address. There is a DNS service 310, which serves the DNS zone 320 of the domain "example.com," which is represented by records of different types ("A" and "MX") on the target shared hosting server 410. The records point to the IP address of the domain services on the target shared hosting server 410.

When the end-user 150 of the services tries to resolve the domain name to the IP address, it uses the provider's DNS server 260, which (with the help of DNS servers chain 250) finally points to the source shared hosting server 110. The shared hosting server has the DNS service 310 configured by the migrator 450 to serve the "example.com" DNS zone as a slave zone 520, where a master zone is located on the target DNS server 310. Thus, when the end-user requests the IP address of a service, he finally gets the IP address of the target shared hosting server.

Figure 6:
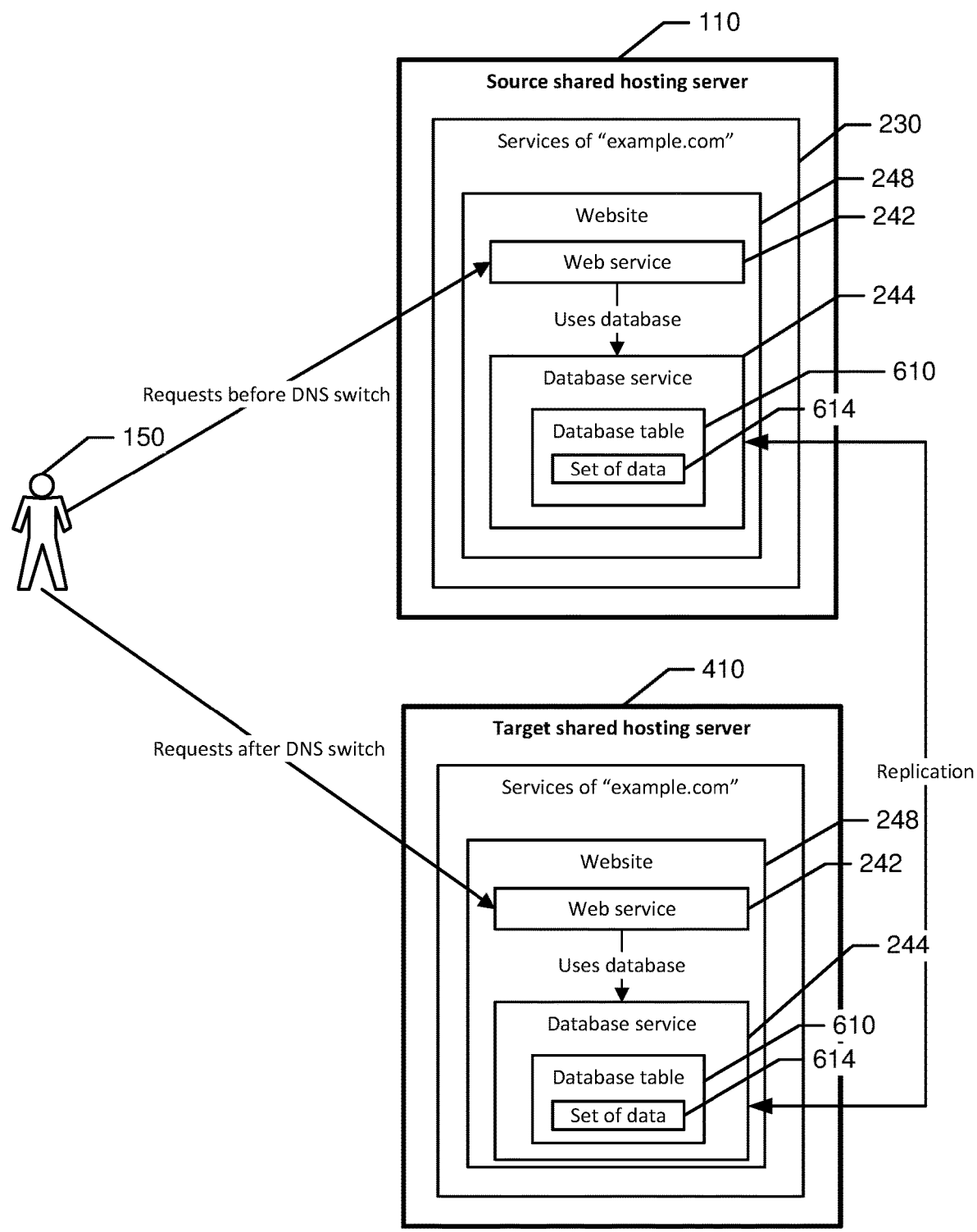
FIG. 6 illustrates an initial database server configuration, in accordance with the exemplary embodiment.

FIG. 6 illustrates an initial database server configuration, in accordance with the exemplary embodiment. FIG. 6 shows how a migrated web application works after the initial migration is performed. There are two servers: the source shared hosting server 110 and the target shared hosting server 410. There is a domain "example.com" with the website 248 consisting of the web service 242 and the database service 244 residing on both of the servers. The replication between the database services of the source shared hosting server 110 and the target shared hosting server 410 is configured. This means that the same database tables 610 have the same set of data 614 at the same moment. When the end-user 150 requests a website before the DNS switch, the request goes to the source shared hosting server 110. When the end-user 150 requests a website after the DNS switch, the request goes to the target shared hosting server. Since both have the same set of rows in database table 610, the end-user 150 gets the same request results before and after the DNS switch.

Figure 7:
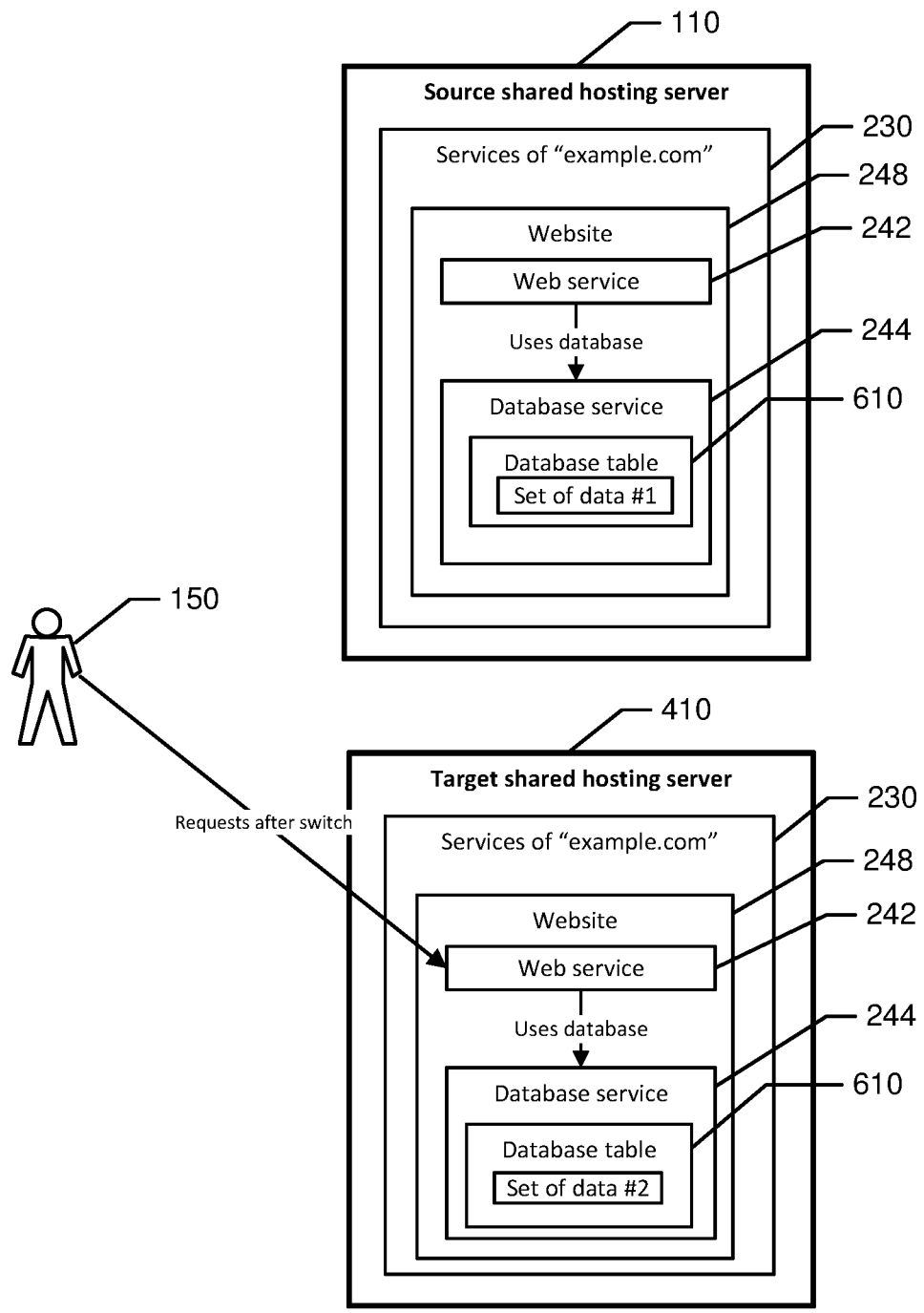
FIG. 7 illustrates a final database server configuration when the replication is on, in accordance with the exemplary embodiment.

FIG. 7 illustrates a final database server configuration when replication is on, in accordance with the exemplary embodiment. FIG. 7 shows how the migrated web application works after the finalization. There are two servers: the source shared hosting server 110 and the target shared hosting server 410. There is a domain "example.com" with the website 248 consisting of the web service 242 and the database service 244 residing on both of the servers. The replication between the database services of the source shared hosting server 110 and the target shared hosting server 410 is disabled. This means that the same database tables 610 on the servers can have different sets of data (#1 and #2) at the same moment. As DNS switch is performed, the end-user 150 requests to the website to always go to the target shared hosting server 410, so the data set #1 is not used.

Figure 8:
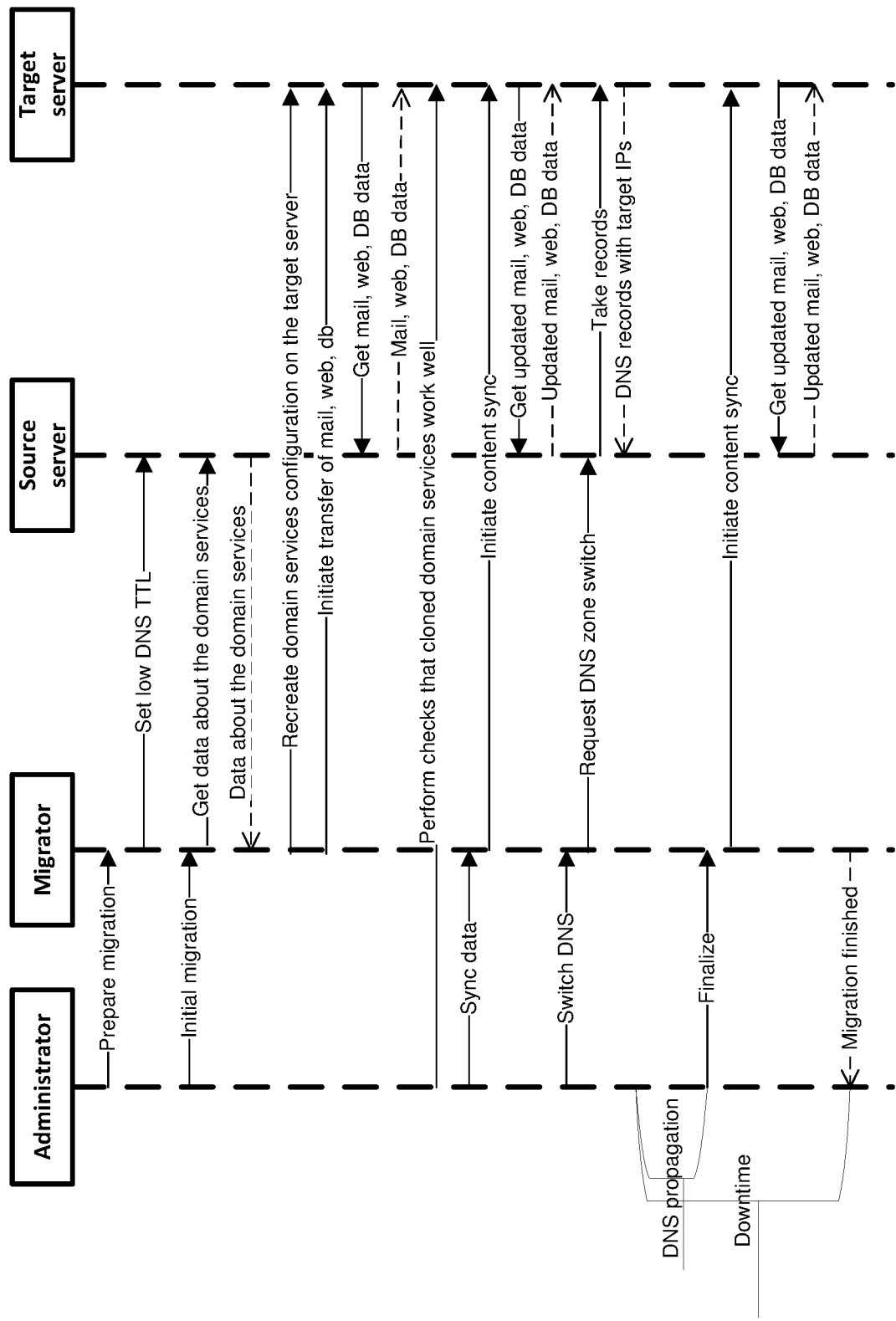
FIG. 8 illustrates a diagram of the migration algorithm, in accordance with the exemplary embodiment.

FIG. 8 illustrates a diagram of the migration algorithm, in accordance with the exemplary embodiment. FIG. 8 shows migration sequence from an administrator's point of view. The migration algorithm includes the following steps:

- setting low DNS time to live (TTL) values on a source shared hosting server; for example, commonly used TTL values are several hours or several days; at that step it is set to several minutes or seconds;
- acquiring data of source domain services;
- recreating domain services' configuration on a target shared hosting server;
- initiating a transfer of mail services, web services and database services from the source shared hosting server;
- acquiring web, mail and database data by the target shared hosting server;
- checking functionality of cloned domain services on the target shared hosting server;
- acquiring updated web, mail and database data by the target shared hosting server;
- requesting a DNS zone switch from the source shared hosting server, by a migrator module;
- providing DNS records with target IP addresses to the source shared hosting server from the target shared hosting server;
- initiating a content synchronization by the migrator;
- updating web, mail and database data on the target shared hosting server; and
- acquiring updated mail, web and database data from the target shared hosting server.

Figure 9:
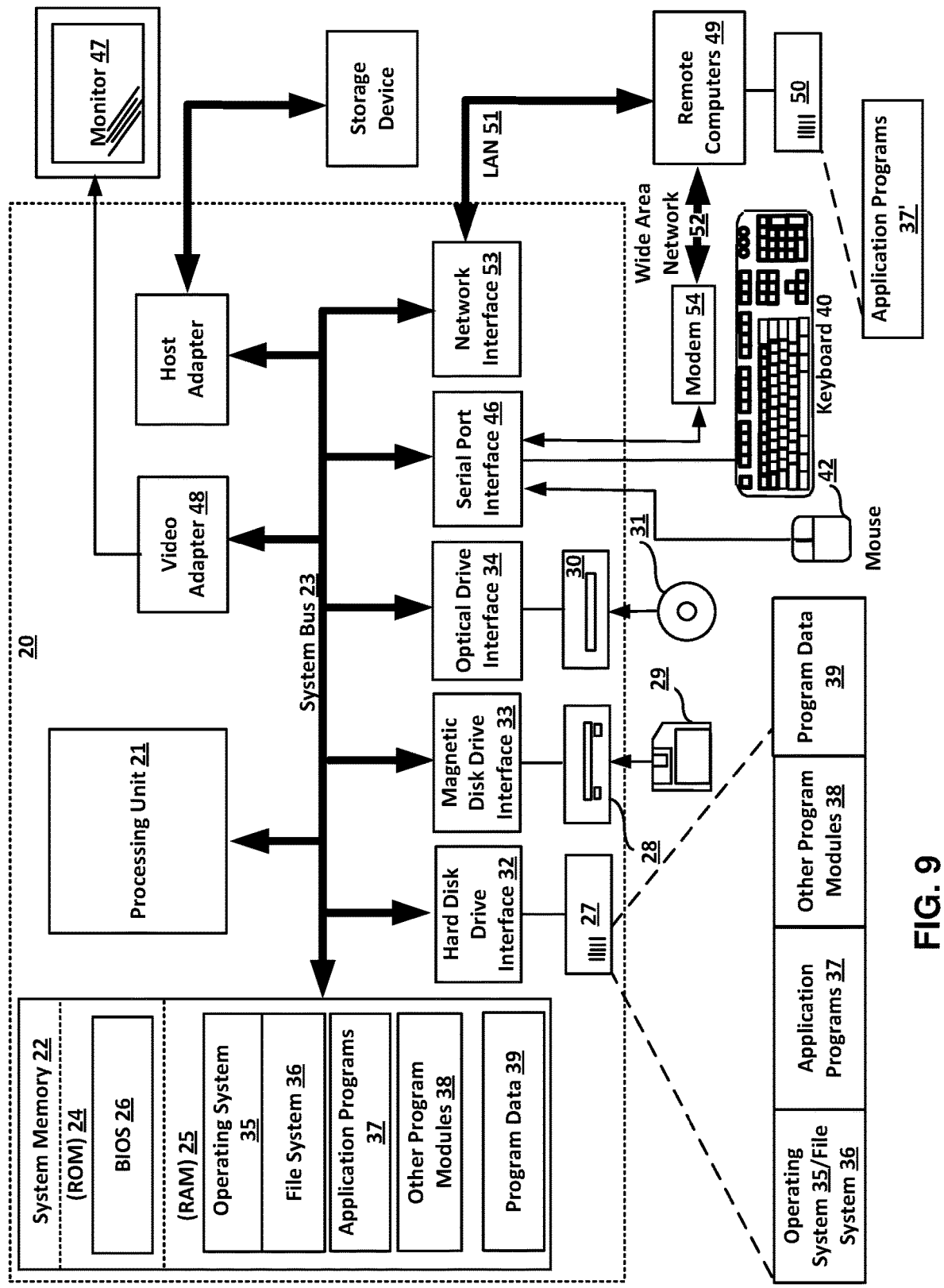
FIG. 9 illustrates a computer system or a host server, which can be used in the exemplary embodiment.

With reference to FIG. 9, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for migration of a shared hosting environment, the system comprising:
   a source shared hosting server including a processor coupled to a memory and configured to host a plurality of source domain services running at least one source web site and a source mail service;
   a source control panel configured to configure the source shared hosting server;
   a target shared hosting server connected over a network to the source shared hosting server and configured to host at least the plurality of the source domain services;
   a target control panel for configuring the target shared hosting server;
   a migrator module connected to the source shared hosting server and to the target shared hosting server; and
   a source DNS server running on the source shared hosting server having source DNS zones and their corresponding domains,
   wherein the migrator module is configured to:
      create a configuration of the source web site and the source mail service on the target shared hosting server;
      copy files and mail messages from the source shared hosting server to the target shared hosting server corresponding to the configuration;
      create databases corresponding to the source web site on the target shared hosting server, if a database replication is not available;
      create target DNS zones and the corresponding domains on the target shared hosting server with DNS records pointing to the target shared hosting server; and
   wherein, for each migrated domain on the source shared hosting server, time to live (TTL) values are decreased on the source DNS server to enable rapid switching of the DNS records to the target server,
   wherein the target DNS zones are constructed based on the source DNS zones, a DNS template of the source control panel and a DNS template of the target control panel.

2. The system of claim 1, wherein the migrator module is configured to perform a DNS switch of a domain name server (DNS) for the source shared hosting server to the same DNS records as the DNS records for the target shared hosting server.

3. The system of claim 2, wherein the migrator module is configured to perform the DNS switch by setting the source DNS zones as slaves to the DNS zones on the target shared hosting server.

4. The system of claim 2, wherein the migrator module is configured to start a content synchronization and to disable the database replication after a DNS TTL value is elapsed.

5. The system of claim 2, wherein the migrator module is configured to increase the TTL values on the target shared hosting server after the DNS entry is updated on the source shared hosting server.

6. The system of claim 5, wherein the migrator module first stores old TTL values of the source DNS zones into a file or a database in order to restore the TTL values later.

7. The system of claim 6, wherein the migrator module changes the TTL values of the DNS zones on the source shared hosting server by using a source control panel application programming interface (API).

8. The system of claim 1, wherein a proxy is installed to the source server wherein the proxy sends each incoming request to a web site on the source server and a web site on the target server and ignores any response from the web site on the target server.

9. The system of claim 1, wherein the migrator module uses a service detects a moment of the DNS switch for starting content synchronization.

10. The system of claim 9, wherein the service uses a plurality of DNS resolvers to detect the moment, and wherein the DNS resolvers run on different operating systems and/or have different physical locations and/or are connected to the Internet by different internet service providers.

11. The system of claim 9, wherein the service provides an API with a method to start checking a domain and a method to test whether the DNS switch happened for the domain.

12. A method for migration of a shared hosting environment, the method comprising:
   on a source shared hosting server including a processor coupled to a memory and configured to host a plurality of source domain services, running at least one source web site and a source mail service;
   using a source control panel to configure the source shared hosting server;
   on a target shared hosting server connected over a network to the source shared hosting server, hosting at least the plurality of the source domain services;
   using a target control panel to configure the target shared hosting server;
   connecting a migrator module to the source shared hosting server and to the target shared hosting server; and
   running a source DNS server on the source shared hosting server having source DNS zones and their corresponding domains,
   wherein the migrator module
      creates a configuration of the source web site and the source mail service on the target shared hosting server;
      copies files and mail messages from the source shared hosting server to the target shared hosting server corresponding to the configuration;
      creates databases corresponding to the source web site on the target shared hosting server, if a database replication is not available;

creates target DNS zones and the corresponding domains on the target shared hosting server with DNS records pointing to the target shared hosting server; and wherein, for each migrated domain on the source shared hosting server, time to live (TTL) values are decreased on the source DNS server to enable rapid switching of the DNS records to the target server, wherein the target DNS zones are constructed based on the source DNS zones, a DNS template of the source control panel and a DNS template of the target control panel.

\* \* \* \* \*